United States Patent
Lazur

(10) Patent No.: US 9,573,853 B2
(45) Date of Patent: Feb. 21, 2017

(54) MELT INFILTRATION APPARATUS AND METHOD FOR MOLTEN METAL CONTROL

(71) Applicant: Rolls-Royce Corporation, Indianapolis, IN (US)

(72) Inventor: Andrew J. Lazur, Huntington Beach, CA (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 192 days.

(21) Appl. No.: 14/207,001

(22) Filed: Mar. 12, 2014

(65) Prior Publication Data

US 2014/0363577 A1 Dec. 11, 2014

Related U.S. Application Data

(60) Provisional application No. 61/799,486, filed on Mar. 15, 2013.

(51) Int. Cl.

| | |
|---|---|
| C04B 41/00 | (2006.01) |
| C04B 35/573 | (2006.01) |
| C04B 35/628 | (2006.01) |
| C04B 35/80 | (2006.01) |
| C22C 1/10 | (2006.01) |
| C04B 41/85 | (2006.01) |
| C04B 41/88 | (2006.01) |
| C04B 41/50 | (2006.01) |
| C04B 41/51 | (2006.01) |

(52) U.S. Cl.
CPC ......... *C04B 41/0018* (2013.01); *C04B 35/573* (2013.01); *C04B 35/62863* (2013.01); *C04B 35/62868* (2013.01); *C04B 35/62873* (2013.01); *C04B 35/806* (2013.01); *C04B 41/009* (2013.01); *C04B 41/5096* (2013.01); *C04B 41/5133* (2013.01); *C04B 41/85* (2013.01); *C04B 41/88* (2013.01); *C22C 1/1036* (2013.01); *B22F 2999/00* (2013.01); *C04B 2235/5244* (2013.01); *C04B 2235/5248* (2013.01); *C04B 2235/616* (2013.01); *F05D 2300/6033* (2013.01)

(58) Field of Classification Search
CPC .... C04B 41/0018; C04B 41/88; C04B 41/009; C04B 41/85; C04B 41/5096; C04B 41/5133; C04B 35/62868; C04B 35/62873; C04B 35/806; C04B 35/62863
USPC ...................... 425/197, 129.1; 264/257, 259
See application file for complete search history.

(56) References Cited

U.S. PATENT DOCUMENTS

| | | |
|---|---|---|
| 1,184,523 A | 5/1916 | Field |
| 3,310,427 A | 3/1967 | Cheney et al. |
| 4,036,280 A | 7/1977 | Rohrig et al. |

(Continued)

FOREIGN PATENT DOCUMENTS

| | | |
|---|---|---|
| BE | 643053 A | 7/1964 |
| EP | 0636700 A2 | 2/1995 |
| WO | 2007094862 A2 | 8/2007 |

OTHER PUBLICATIONS

International Search Report and Written Opinion for International Application No. PCT/US2014/024595, Jul. 17, 2014, 9 pages.

(Continued)

*Primary Examiner* — Nahida Sultana
(74) *Attorney, Agent, or Firm* — Brinks Gilson & Lione

(57) ABSTRACT

A method and apparatus for providing molten metal infiltration into a component is provided.

15 Claims, 6 Drawing Sheets

(56) References Cited

U.S. PATENT DOCUMENTS

| | | |
|---|---|---|
| 4,141,948 A | 2/1979 | Laskow et al. |
| 4,148,894 A | 4/1979 | Hillig et al. |
| 4,149,704 A | 4/1979 | de Savigny |
| 4,220,455 A | 9/1980 | St. Pierre et al. |
| 4,238,433 A | 12/1980 | Hillig et al. |
| 4,240,835 A | 12/1980 | Laskow et al. |
| 4,242,106 A | 12/1980 | Morelock |
| 4,247,304 A | 1/1981 | Morelock |
| 4,353,953 A | 10/1982 | Morelock |
| 4,522,322 A | 6/1985 | Gunterman et al. |
| 4,626,516 A | 12/1986 | Morelock |
| 4,793,859 A | 12/1988 | Morelock |
| 5,164,098 A | 11/1992 | Brown et al. |
| 5,198,167 A * | 3/1993 | Ohta .................. B29C 43/14 162/152 |
| 5,205,970 A | 4/1993 | Brun et al. |
| 5,390,723 A | 2/1995 | Mohla et al. |
| 5,464,655 A | 11/1995 | Takahata |
| 5,718,415 A | 2/1998 | Dainton |
| 6,110,535 A | 8/2000 | Rey et al. |
| 6,120,726 A | 9/2000 | Eggert et al. |
| 6,148,899 A | 11/2000 | Cornie et al. |
| 6,186,768 B1 * | 2/2001 | Schmitt .................. H01L 23/15 257/E23.009 |
| 6,223,937 B1 | 5/2001 | Schmidt |
| 6,235,379 B1 | 5/2001 | Kameda et al. |
| 7,238,308 B2 | 7/2007 | Rosenloecher |
| 7,736,554 B2 | 6/2010 | Thebault et al. |
| 8,071,011 B2 | 12/2011 | Drozny et al. |
| 8,083,987 B2 | 12/2011 | Schlienger |
| 2002/0166649 A1 * | 11/2002 | Gegel .................. B22D 18/02 164/98 |
| 2003/0156963 A1 * | 8/2003 | Lorenz .................. B22F 3/26 419/2 |
| 2004/0009086 A1 * | 1/2004 | Sachs .................. C22C 1/0475 419/2 |
| 2004/0113302 A1 * | 6/2004 | La Forest .............. B29C 70/48 264/29.1 |
| 2006/0006212 A1 | 1/2006 | Thebault et al. |
| 2011/0096121 A1 | 4/2011 | Anderson et al. |
| 2011/0274911 A1 | 11/2011 | Drozny et al. |
| 2013/0171426 A1 * | 7/2013 | de Diego .............. C04B 35/117 428/182 |
| 2014/0272373 A1 * | 9/2014 | Chamberlain ........ C04B 35/806 428/293.4 |
| 2014/0306372 A1 * | 10/2014 | Gillessen .............. B29C 70/36 264/219 |
| 2015/0343714 A1 * | 12/2015 | Weimer .................. B29C 70/42 264/279 |
| 2015/0364667 A1 * | 12/2015 | Jarmon .................. H01L 35/30 136/208 |

OTHER PUBLICATIONS

International Search Report for PCT International Application Serial No. PCT/US2014/024965, completed Jul. 17, 2014, (11 pages).

* cited by examiner

MELT INFILTRATION APPARATUS AND METHOD FOR MOLTEN METAL CONTROL

CROSS REFERENCE TO RELATED APPLICATIONS

This application claims priority to and the benefit of U.S. Provisional Patent Application No. 61/799,486, filed 15 Mar. 2013, the disclosure of which is now expressly incorporated herein by reference.

FIELD OF THE DISCLOSURE

The present disclosure relates generally to ceramic matrix composites, and more specifically to melt infiltration.

BACKGROUND

Ceramic Matrix Composites (CMCs) are materials that include ceramic fibers embedded in a ceramic matrix. CMCs typically exhibit desirable mechanical, chemical and physical properties at high temperatures. For example, CMCs are typically more resistant to oxidation at high temperatures than are metals. CMCs are generally tougher than monolithic ceramics and exhibit damage tolerance. Accordingly, CMCs are suitable for a number of high temperature applications, such as for example and without limitation use in producing components of gas turbine engines. Gas turbine engines illustratively are used to power aircraft, watercraft, power generators, and the like. CMC components illustratively may operate at much higher temperatures than other components, including for example superalloy metal components.

The manufacture of CMCs typically includes introducing a melt infiltrant to the ceramic matrix or composite body. Infiltration may be accomplished through a wick. The wick typically is disposed between the source of the infiltrant and the composite body on a generally flat surface.

SUMMARY

The present application discloses one or more of the features recited in the appended claims and/or the following features which, alone or in any combination, may comprise patentable subject matter.

An illustrative infiltration apparatus may comprise or be adapted to include a material having a melting point. The material, may be for example an infiltrant. The apparatus may further include a second material, which may serve as a barrier. The barrier illustratively has a melting point that is illustratively higher than the melting point of an infiltrant. The apparatus may further comprise an article of manufacture such as a component. Included in the illustrative embodiment is a wick in communication with the component. The wick is also illustratively in communication with the infiltrant. The component may comprise a ceramic matrix composite.

In some embodiments, the infiltrant may be received by a melt reservoir such as for example a crucible.

According to another aspect of the present disclosure, an illustrative method of providing an infiltrant into a component is disclosed may include providing an infiltrant; providing a wick in fluid communication with a porous component; and infusing the infiltrant into the porous component by introducing the infiltrant into and through the wick. The method may include providing a barrier. The barrier illustratively may be disposed between the infiltrant and the component. Illustratively the barrier has a melting point that is higher than the melting point of the infiltrant. Raising the temperature of beyond the melting point of the barrier allows the infiltrant to flow through the wick to the component. The method includes choosing the barrier to control the parameters of the infiltration. For example, the time of infiltration and/or the temperature may be controlled. The component may comprise a ceramic matrix composite.

The method and apparatus illustratively provide for improved component infiltration leading to higher density, higher proportional limit and longer component life.

The method and apparatus illustratively provide the ability to control molten metal contact time with the composite body resulting in limited degradation of the composite body.

The method and apparatus illustratively provide for improved uniformity of the microstructure resulting from the reaction of infiltrant and elements in the composite body.

The method and apparatus illustratively provide for improved ability to monitor the process if coupled with thermal imaging or other technique because a major change will happen once the barrier is breached and Si begins to flow. This will support accurate process timing to produce more consistent components.

These and other features of the present disclosure will become more apparent from the following description of the illustrative embodiments.

DETAILED DESCRIPTION OF THE DRAWINGS

Figure 1:
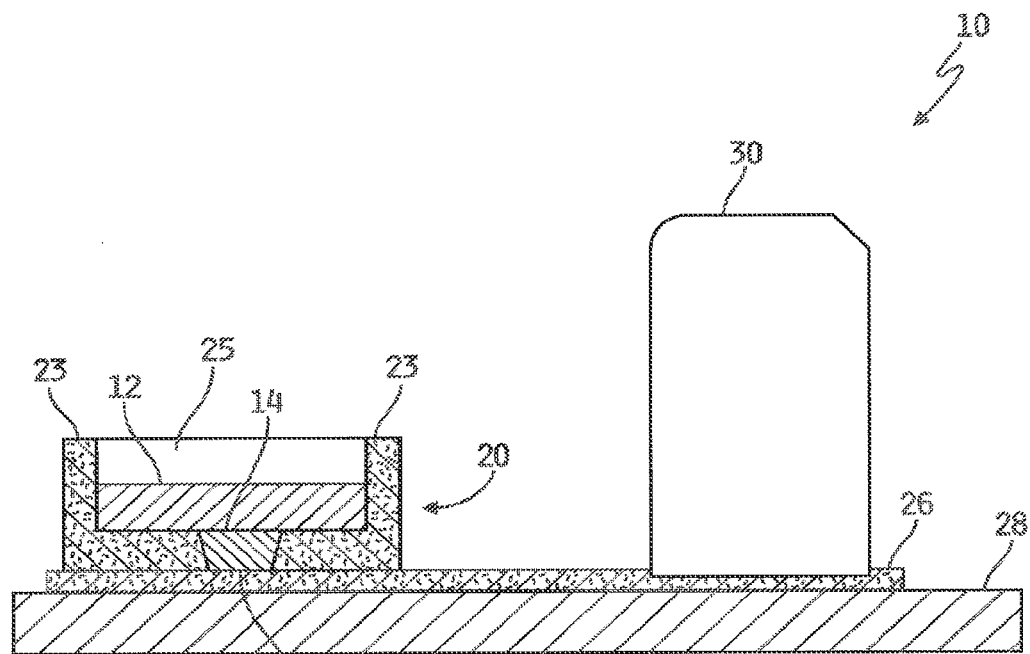
FIG. 1 is a partial cross-sectional view of an illustrative melt transfer system.

For the purposes of promoting an understanding of the principles of the disclosure, reference will now be made to a number of illustrative embodiments illustrated in the drawings and specific language will be used to describe the same.

Referring to the Figures an illustrative apparatus 10 and method for controlling melt transfer related to the manufacture of a ceramic matrix composite (CMC) and/or metal matrix composite is depicted and disclosed. For example, the illustrative apparatus may temporarily restrict the flow of molten metal or molten metalloid to a ceramic (CMC) or metal matrix composite 30.

Illustratively, referring to the Figures, illustrative embodiments are depicted. As shown in FIG. 1, an illustrative apparatus for practicing a method of manufacturing a CMC or metal matrix composite, for example a component is shown. The illustrative apparatus generally comprises an infiltrant source or vessel 20, which illustratively may comprise a crucible 20, a transport conduit 26, which illustratively may comprise a wick 26, and an article of manufacture 30, which illustratively may comprise a component 30 or a composite 30 as depicted diagrammatically in the Figures. Illustratively, the component 30 is a porous body 30. The crucible 20 illustratively includes a pair of spaced apart side walls 23 that define an infiltrant well 25 therebetween. The well 25 is configured to receive therein a first material or infiltrant 12. Defined in the bottom of the crucible 20 is a discharge conduit 24 or drain 24 in fluid communication with the well 25 and the wick 26 and illustratively disposed therebetween. It should be understood that infiltrant 12 may be deposited in the well 25 for melting, may be melted elsewhere and deposited in the well in molten form, or may be melted elsewhere and deposited in the wick directly or locally. For example and without limitation, the crucible 20 could be bypassed, or even dispensed with completely if desired, in the illustrative embodiments of FIG. 2-3 as will be further explained. In such a case, the infiltrant source 20 will be any suitable delivery device other than the crucible.

The apparatus 10 illustratively is supported or carried by a suitable support structure such as for example and without limitation base plate 28 or other suitable support structure. It will be appreciated that a combination of support structures may also be used as depicted for example in FIGS. 5-9. While the illustrative embodiments shown in FIGS. 5-9 each uses an illustrative base plate 28 (e.g., FIGS. 5, 5A, 7, 8 and 9) to support the component(s) 30, 30A, they each illustratively also use the component 30 as the support for the infiltrant 12, for example in the crucible 20. Further illustratively, FIG. 6 shows an illustrative embodiment where a base plate 28 supports the component 30 and an elevated pedestal 32 support structure to support the crucible 20 and the wick 26. As best seen in FIG. 1, illustratively, the higher melting temperature plug or barrier 14 is received within the drain or discharge 24 of the crucible or infiltrant source 20 holding the infiltrating metal or infiltrant 12. Illustratively, barrier 14 could be a high purity metal where infiltrant 12 is an alloy with a lower melting temperature than the barrier. The differential in melting points may be tailored to achieve the desired result. The plug 14 may be machined and fit into the crucible with adhesive. The plug may also be cast into the crucible. If there are thermal stresses between the plug and the crucible they may be used to improve the seal or the angle between the crucible and the plug and may be tailored to minimize or eliminate any stresses. When the plug 14 reaches its melting point it mixes with the infiltrant 12 and allows the infiltrant 12 to flow into the wick 26 and subsequently the composite body. Thus, the melting of the plug 14 opens drain 24 to provide fluid communication between the infiltrant well 25 and the wick 26.

Figure 2:
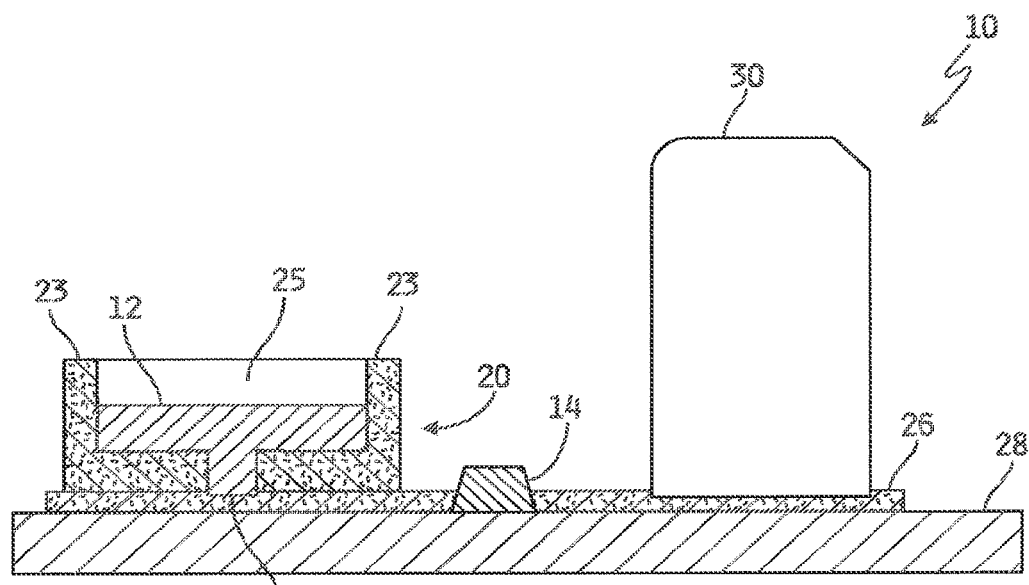
FIG. 2 is a partial cross-sectional view of another illustrative melt transfer system.

As best seen in FIG. 2, an illustrative apparatus for and method of infiltration is shown wherein the wick 26 is filled with the higher melting temperature or temporary dissolving barrier 14 material placed between the infiltrant source or crucible 20 and the component 30. The barrier 14 could be directly under the crucible.

Figure 3:
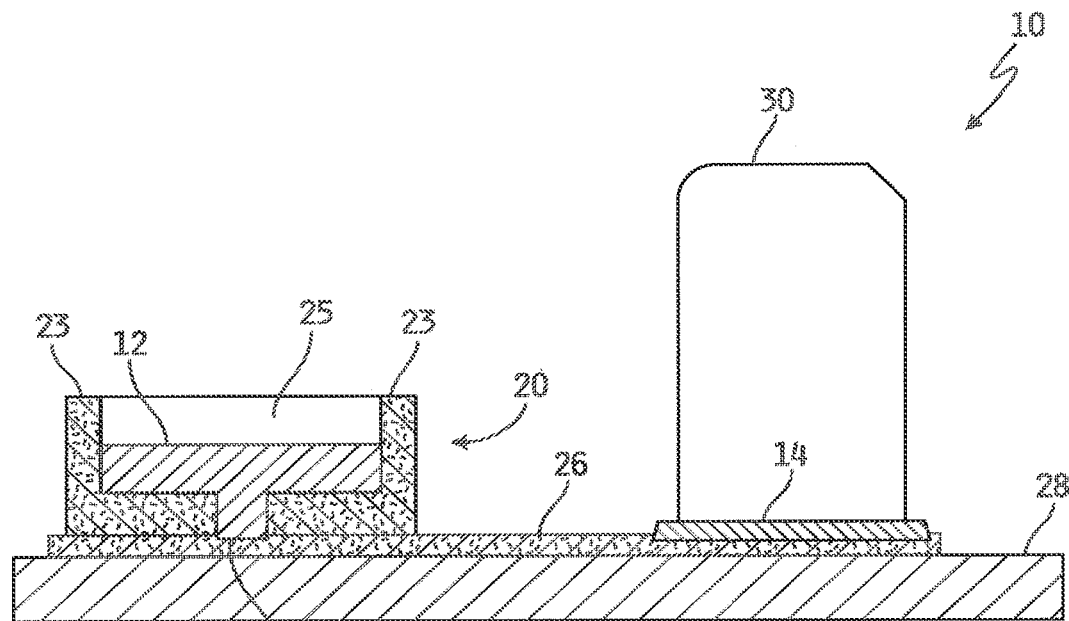
FIG. 3 is a partial cross-sectional view of another illustrative melt transfer system.

FIG. 3 illustrates an exemplary apparatus for and method of infiltration where the higher melting temperature or temporary dissolving barrier 14 material is applied to the composite body or component 30 and makes contact with the wick 26.

Figure 3A:
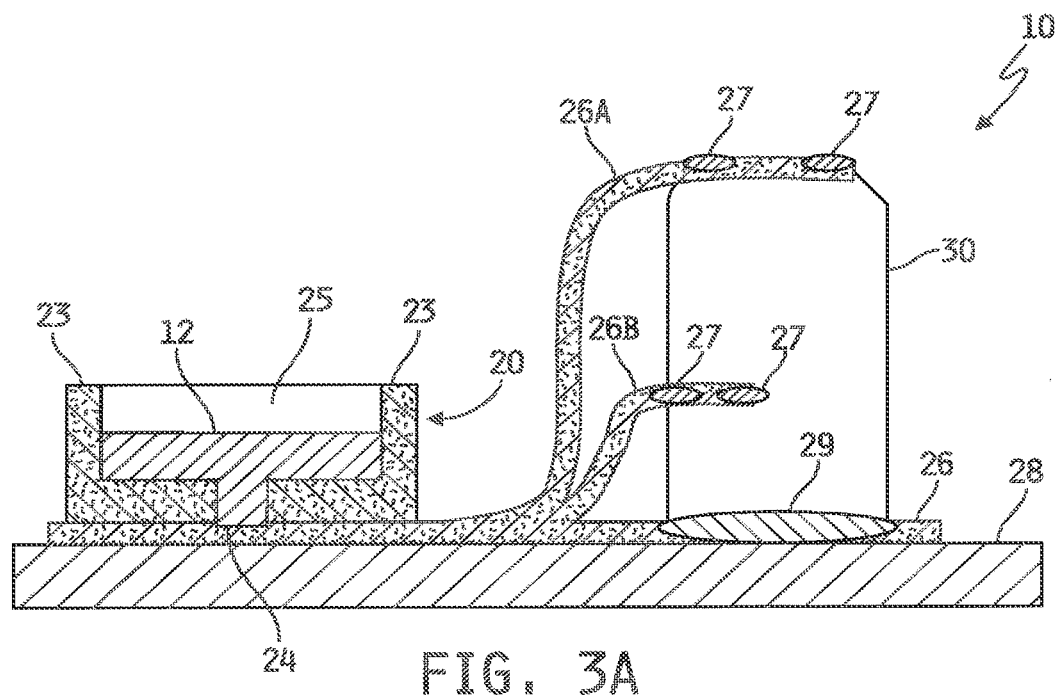
FIG. 3A is a partial cross-sectional view of another illustrative melt transfer system.

FIG. 3A illustrates an exemplary apparatus for and method of infiltration where the higher melting temperature or temporary dissolving barrier 14 material is applied to the composite body or component 30 and makes contact with a wick 26 having multiple branches or prongs 26, 26A, 26B.

Figure 4:
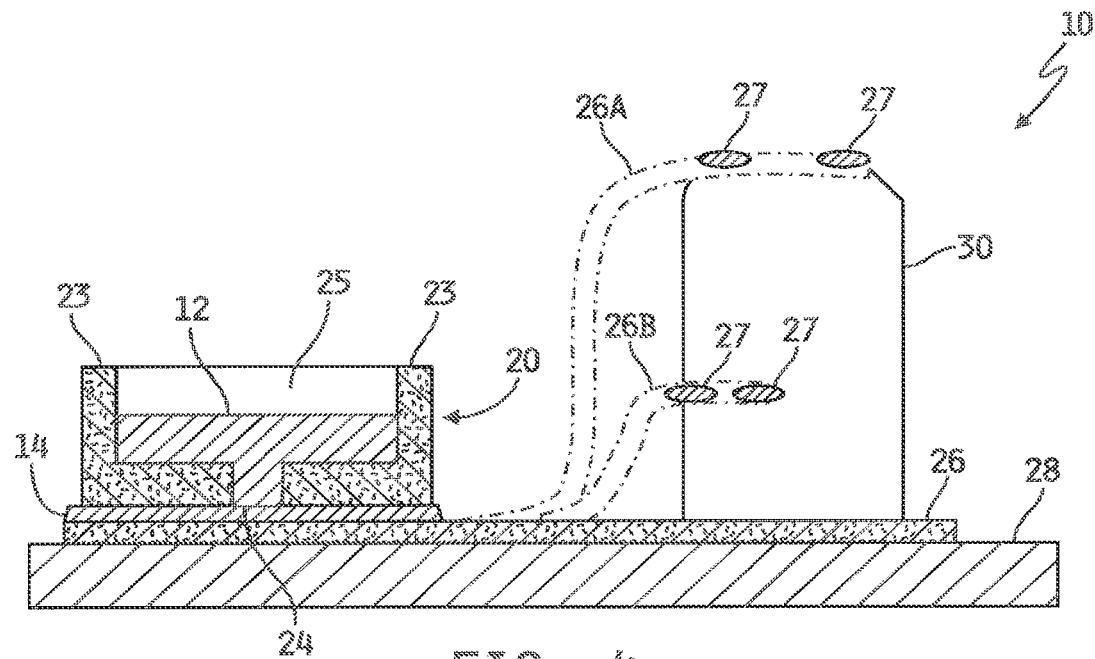
FIG. 4 is a partial cross-sectional view of another illustrative melt transfer system.

FIG. 4 illustrates a method employing a sheet of the higher melting temperature or temporary dissolving barrier material 14 placed under the crucible or infiltrant source 20. In addition, FIG. 4 shows in phantom additional wick prongs or branches 26A, 26B. These additional branches 26A, 26B illustratively operate in the same manner as the main wick 26 in that they allow the infiltrant to flow into the component when the barrier 14 dissolves. It will be appreciated, however, that in an illustrative embodiment wherein the branches 26A, 26B are in a direct line in fluid communications between the component and the infiltrant source, the infiltrant 12 could be directed to the component 30 at different times and temperatures. For example, referring to FIG. 6, a dissolving barrier (not shown) could be disposed over the top of the component 30, which would allow infiltrant moving through branch wicks 26A and 26B to infiltrate prior to the infiltrant moving through the wick 26 at the top that must first melt or dissolve the barrier.

Figure 5:
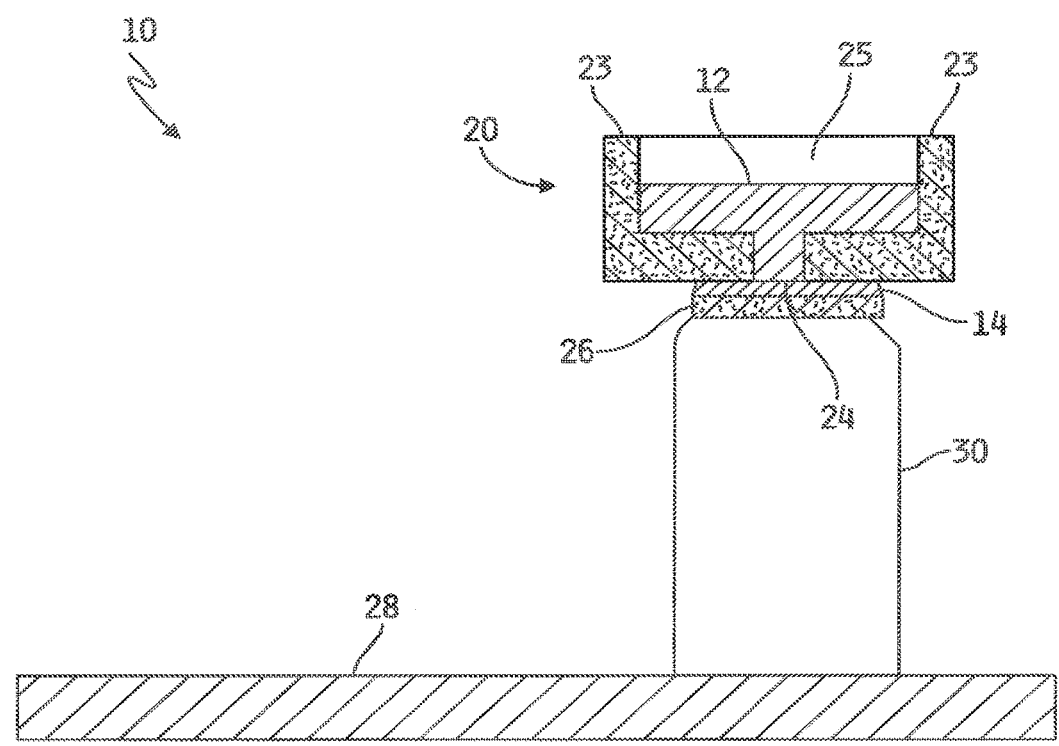
FIG. 5 is a partial cross-sectional view of another illustrative melt transfer system.
Figure 5A:
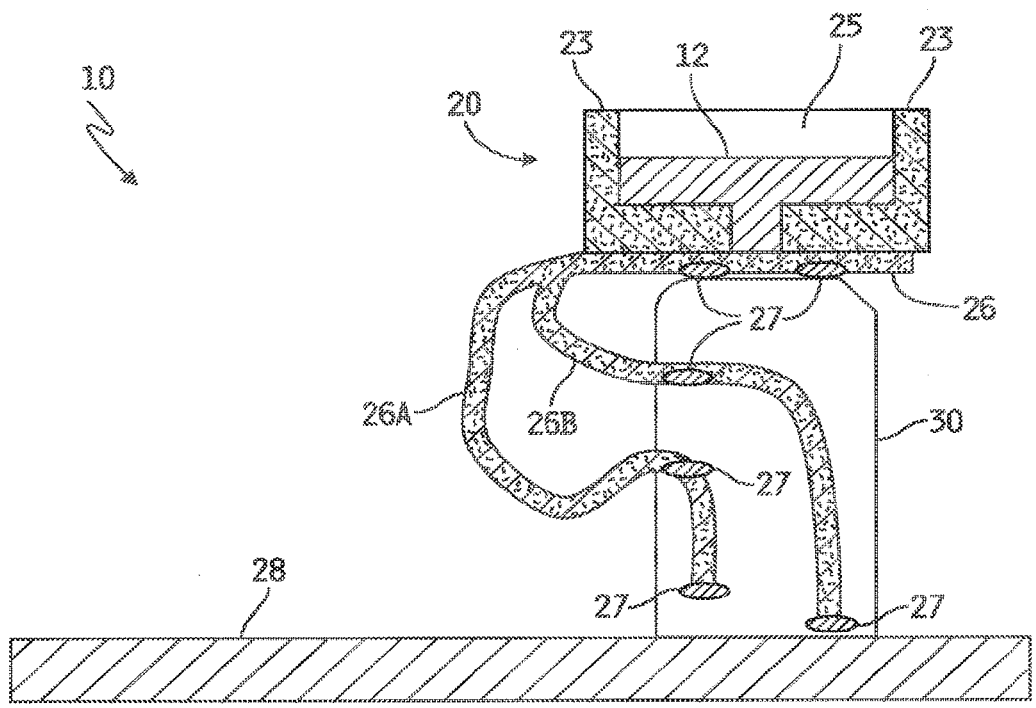
FIG. 5A is a partial cross-sectional view of another illustrative melt transfer system.
Figure 6:
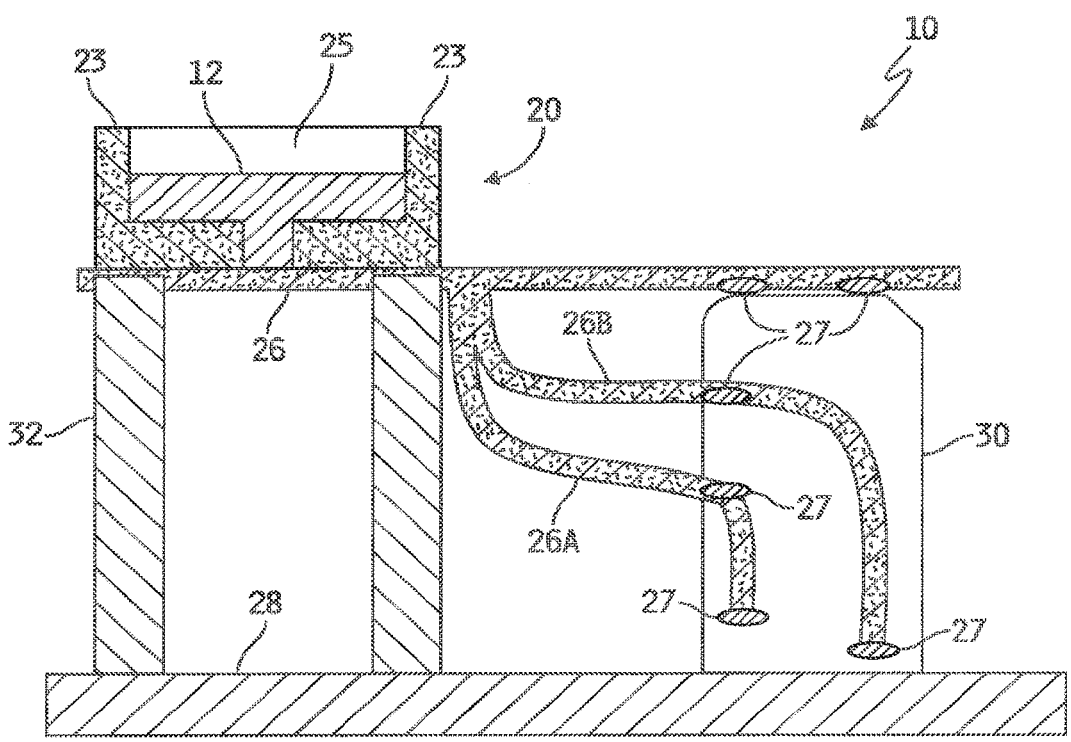
FIG. 6 is a partial cross-sectional view of another illustrative melt transfer system.
Figure 7:
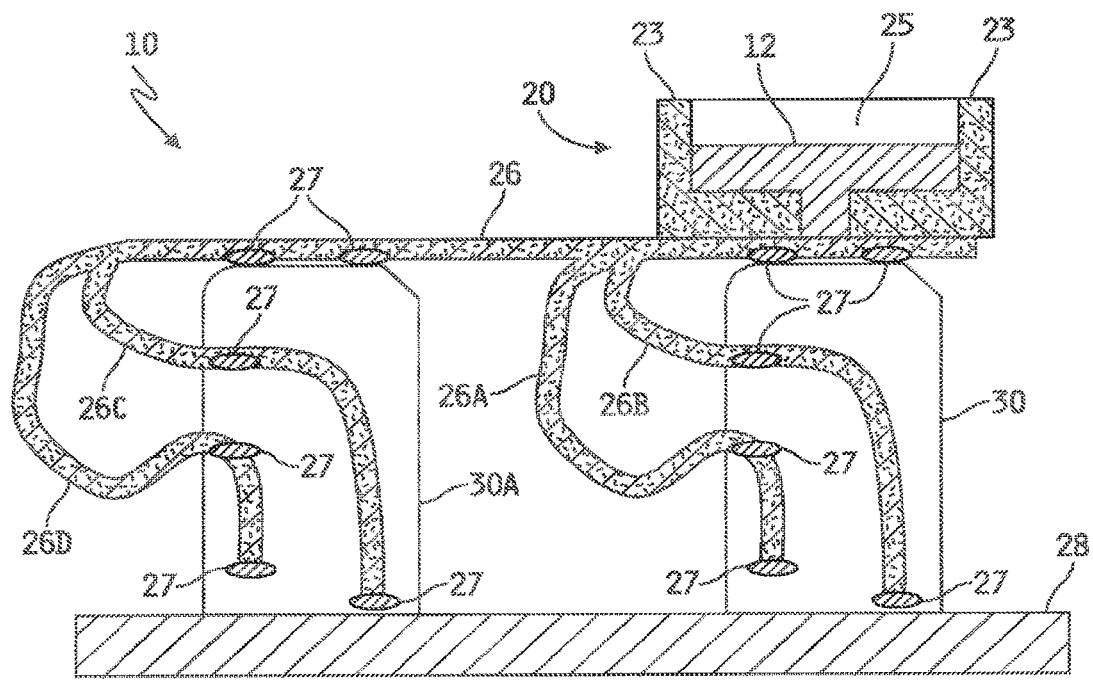
FIG. 7 is a partial cross-sectional view of another illustrative melt transfer system.
Figure 8:
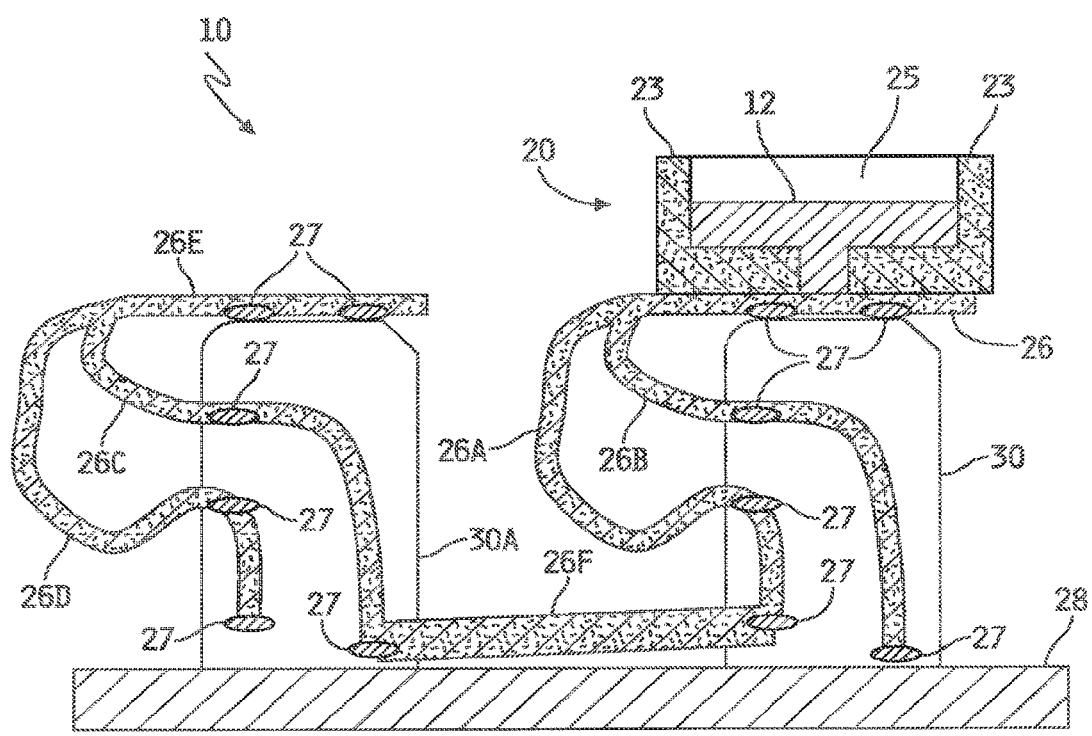
FIG. 8 is a partial cross-sectional view of another illustrative melt transfer system.
Figure 9:
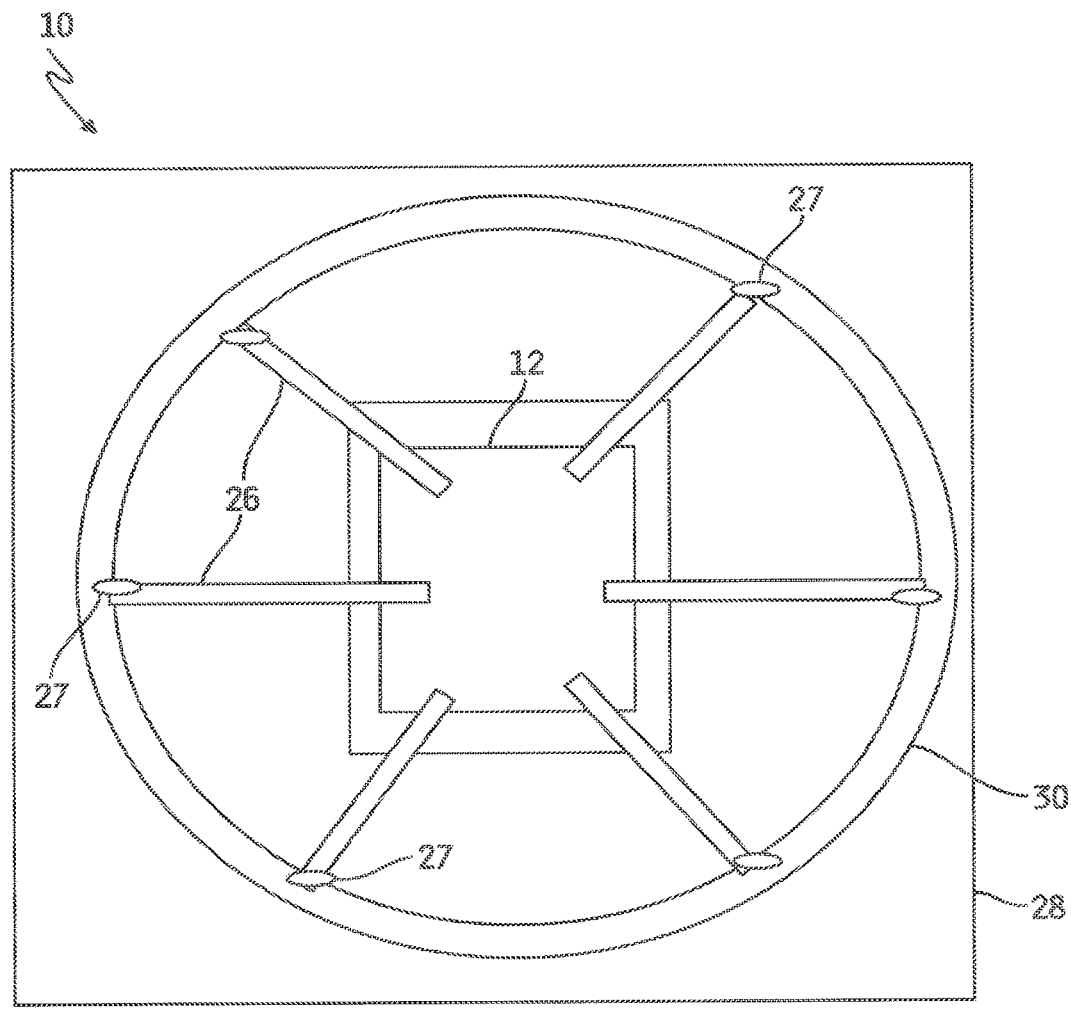
FIG. 9 is a partial cross-sectional view of another illustrative melt transfer system.
Figure 10:
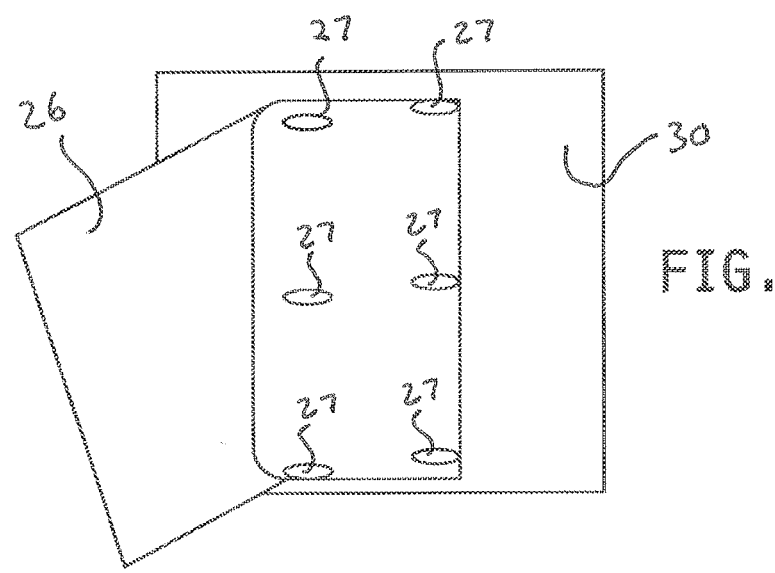
FIG. 10 is a cross-sectional view of the welds of the illustrative melt transfer system of FIG. 9.

Referring to FIG. 5, an exemplary apparatus for and method of infiltration 10 where the infiltrant source 20 is supported directly on the component 30 with the higher melting temperature or temporary dissolving barrier 14 material is applied across and in contact with the entire width of the wick 26, which is disposed across the entire width of the top of the composite body or component 30. It will be appreciated that the wick 26 could be omitted.

The remaining FIGS. 5A through 10 depict illustrative embodiments 10 showing alternative wick arrangements and connections. While the barrier 14 is not shown in these Figures, these illustrative embodiments may all be adapted for use with the apparatus and method 10 disclosed herein. In addition, with respect to the continuous weld 29 of FIG. 3A, it could be a third material with yet a higher melting point relative to the infiltrant 12, such that it could be used in conjunction with or in lieu of a barrier 14.

It will also be appreciated that any combination of the foregoing barrier 14 placements and wicks 26, 26A-F shown in the Figures could be used to control the infiltration as desired. Also, multiple barriers 14 could be used in a single apparatus 10. In addition, any suitable infiltrant and barrier material and combinations thereof may be used. Some non-exhaustive examples of illustrative infiltrants 12 and higher melting point metal or dissolving barrier 14 are listed below along with some illustrative melting points. This list is illustrative only and not all inclusive.

| Infiltrant | Barrier |
|---|---|
| Pure Si Tmelt 1410° C. | Si/Zr alloy where Tmelt is 1430° C. |
| Si/C/B alloy Tmelt 1395° C. | Pure Si Tmelt 1410° C. |
| Pure Si Tmelt 1410° C. | Pure silicon wafer coated with 1 μm of SiC that dissolves in molten Si |
| Zr/Si eutectic | Zr/Si alloy with Tmelt 40° C. higher |
| Pure Zr | $ZrB_2$ |
| Ti/6Al/4V | Pure Ti |

In illustrative operation, a material such as for example an alloy 14 with a higher melting temperature or a material that requires time in contact with the molten metal to dissolve into solution is employed between the component 30 and the infiltrating metal or metalloid infiltrant 12. This ensures that the component 30 to be infiltrated is uniformly above the melting point of the infiltrant 12. Illustratively, this process and apparatus 10 may be used for reactive melt infiltration processes wherein the reaction may restrict liquid flow so if a portion of the component is below the melting point local freezing of the metal may delay infiltration and during the delay the reaction may create restrictions to the infiltration that would proceed once the required temperature is achieved. Some further illustrative examples follow.

EXAMPLE 1

SiC/SiC CMC

In an illustrative example, a Hi-Nicalon preform is constructed at 36% fiber volume and assembled in tooling for Chemical Vapor Infiltration (CVI). A boron nitride (BN) interface coating is applied at 0.5 μm. A silicon-carbide (SiC) coating of about 2 μm is applied by CVI. The CMC matrix is completed through slurry and melt infiltration 10. The slurry contains elements that react with the silicon to form ceramic compositions. Illustratively, the melt infiltration process is performed using a graphite crucible 20 or other suitable infiltrant source to hold an alloy of for example Si/C/B. As best seen in FIG. 1, an illustrative barrier 14 comprising a plug of pure silicon (Si) is cast or otherwise disposed into a hole, drain or discharge 24 in the bottom of the infiltrant source or crucible 20. The crucible 20 is placed on top of an illustrative carbon fiber wick 26 that illustratively is bonded to the preform or composite body 30. Illustratively, the component 30 may be for example and without limitation a preform for a nozzle guide vane for a turbine engine produced from a silicon carbide fiber. The entire assembly or apparatus 10 is heated in a vacuum furnace to a temperature of about 1470° C. and held for about one (1) hour then cooled to room temperature. The resulting composite has uniform infiltration and microstructure. The melt infiltration process is performed at a pressure of about 0.1 torr and a temperature between about 1400° C. and about 1500° C. using Si that is at least approximately 99% pure.

EXAMPLE 2

C/SiC CMC

In another illustrative example, a T-300 carbon fiber preform is constructed at 36% fiber volume and assembled in tooling for Chemical Vapor Infiltration (CVI). A pyrocarbon interface coating is applied at 0.5 μm. A SiC coating of 8 μm is applied by CVI. The CMC matrix or component 30 is completed through slurry and melt infiltration using the illustrative method and apparatus 10. The slurry contains elements that react with the silicon to form ceramic compositions. The melt infiltration process is performed by applying a Zr/Si alloy to a carbon wick 26. Referring to FIG. 3, the center of the wick 14 has been cast across the entire width of the component 30, which may be for example a component for use in a gas turbine engine, with a rectangle of pure Zr. The entire assembly or apparatus 10 is heated in a vacuum furnace to a temperature of 1570° C. The Zr dissolves into the melt and slightly changes the composition. The furnace is held at temperature for one (1) hour then cooled to room temperature. The resulting composite has uniform infiltration and microstructure. Illustratively, a CMC may be made with pre-coated fiber (aka "prepreg") process).

It will be appreciated that the ability to control the infiltration process as described and claimed herein illustratively results in a CMC component 30 that demonstrates improved mechanical performance. Further illustratively, the apparatus and method 10 may produce a CMC component 30 with a longer operational life, a reduced weight, and at a lower cost.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An infiltration apparatus comprising:
   an infiltrant having a first melting point,
   an infiltrant source adapted to receive the infiltrant;
   a solid barrier having a second melting point, the solid barrier being selected from the group of materials consisting of Si/Zr, Si, SiC-coated silicon wafer, Zr/Si, $ZrB_2$ and Ti;
   a component comprising a ceramic matrix composite; and
   a wick in fluid communication with the infiltrant source and the component, the wick being configured to draw the infiltrant from the infiltrant source into the component;
   wherein the second melting point is higher than the first melting point; and
   wherein the solid barrier is disposed between the infiltrant source and the component and coupled to the wick to block fluid communication through the wick until the infiltrant melts the barrier to allow the wick to draw the infiltrant from the infiltrant source into the component.

2. The infiltration apparatus of claim 1 wherein the infiltrant source includes an infiltrant well.

3. The infiltration apparatus of claim 2 wherein the barrier is disposed beneath the infiltrant well.

4. The infiltration apparatus of claim 1 wherein the infiltrant source includes a drain in fluid communication with the wick.

5. The infiltration apparatus of claim 4 wherein the barrier is received within the drain.

6. The infiltration apparatus of claim 1 wherein the barrier is displaced away from each of the infiltrant source and the component.

7. The infiltration apparatus of claim 1 wherein the barrier is disposed across a portion of the component.

8. The infiltration apparatus of claim 7 wherein the barrier is disposed across a bottom portion of the component.

9. The infiltration apparatus of claim 7 wherein the barrier is disposed across a top portion of the component.

10. An infiltration apparatus comprising:
    a melt infiltrant having a first melting point;
    a composite body adapted to receive the melt infiltrant to form a component;
    an infiltrant source adapted to store the melt infiltrant therein;
    a first wick configured to conduct the melt infiltrant between the infiltrant source and the composite body and a portion of the first wick being located above a top portion of the infiltrant source to draw the melt infiltrant upwardly above a top of the infiltrant source; and
a barrier coupled to the first wick to block fluid communication between the infiltrant source and the component until the barrier melts, the barrier having a second melting point, and the second melting point being greater than the first melting point.

11. The infiltration apparatus of claim 10 further comprising a second wick configured to draw the melt infiltrant from the infiltrant source into the composite body to allow a portion of the melt infiltrant to bypass the barrier.

12. The infiltration apparatus of claim 11 wherein the barrier is disposed across a bottom portion of the composite body.

13. The infiltration apparatus of claim 10 wherein the barrier is selected from the group of materials consisting of Si/Zr, Si, SiC-coated silicon wafer, Zr/Si, $ZrB_2$ and Ti.

14. The infiltration apparatus of claim 13 wherein the infiltrant is selected from the group of materials consisting of silicon, Si/C/B, Zr/Si, Zr and Ti/6Al/4V.

15. An infiltration apparatus comprising:
an infiltrant having a first melting point,
an infiltrant source adapted to receive the infiltrant and including a drain in fluid communication with the wick;
a solid barrier having a second melting point and being received within the drain;
a component; and
a wick in fluid communication with the infiltrant source and the component, the wick configured to draw the infiltrant from the infiltrant source into the component;
wherein the second melting point is higher than the first melting point; and
wherein the barrier is disposed between the infiltrant source and the component and coupled to the wick to block fluid communication through the wick until the infiltrant melts the barrier to allow the wick to draw the infiltrant from the infiltrant source into the component.

* * * * *